United States Patent Office 3,730,698
Patented May 1, 1973

3,730,698
SEALING OF JOINTS IN REFRACTORY DEVICES WITH SILICATE COATING
Frederick Denys Richardson, Surrey, and Philip Sydney Rogers, Herts, England, assignors to Metallurgic Hoboken-Overpelt, Brussels, Belgium, RST International Metals Limited, London, and Frederick Denys Richardson, Epsom, Surrey, England
No Drawing. Filed Mar. 12, 1971, Ser. No. 123,900
Claims priority, application Luxembourg, Mar. 31, 1970, 60,630
Int. Cl. C03c 27/00, 29/00
U.S. Cl. 65—43                                    16 Claims

ABSTRACT OF THE DISCLOSURE

A method for sealing porous refractory joints which comprises applying a silicate glass to a refractory joint, and melting the silicate glass in order to fill the connecting channels between the pores and to block them with the silicate glass. The refractory joint may be obtained from alumina cement.

In the manufacture of certain refractory devices it is commonly necessary to seal together the various parts by means of cements made, for example, from alumina, magnesia, or zirconia powders mixed with a viscous aqueous silicate solution such as water glass.

Although these cements when dried and fired correctly and used under appropriate conditions can given strong and firm joints between two oxide refractory bodies or between a refractory body and a metal or between two metals, they are always to some extent porous to gases and liquids on account of the water which is lost from the cement in the process of drying and subsequent firing.

In certain cases this porosity to gas may be harmful to the operation of a ceramic device. By way of example, this would be the case of an "E.M.F." probe for measuring continuously the oxygen content of liquid copper and other metals as described for instance in patent applications:Luxembourg No. 55,448 and Great Britain provisional No. 36,549/69. However the present invention is not limited to that particular example.

The present invention has for its object to reduce or suppress such porosity. The invention consists in that a silicate glass is melted into the cement which glass is then drawn by the forces of surface tension and in some cases gravity into the pores between the grains. This seals these pores so that either the pores are filled with glass or the connecting channels between the pores are blocked with glass.

Preferably, the silicate glass is melted into the cement after the refractory device has been dried and fired.

As glasses are normally more susceptible to thermal shock than crystals and as such ceramic devices are commonly subjected to thermal shock by being immersed in liquid metals or hot gases, it may be desirable to choose glasses which readily crystallise to give solid material which is primarily microcrystalline. Such crystallization may occur sufficiently well for some purposes, whilst the device is cooled after melting the glass into the cement, or the crystallization may be specially controlled by cooling first to a temperature at which the glass nucleates rapidly and then raising the temperature to one at which the nuclei grow rapidly, this particular kind of treatment being designed to give crystals of very small size.

The glasses used for this purpose must be chemically compatible with the cements being treated, and give a product which has a satisfactory coefficient of thermal expansion. A glass suitable for some purposes is the following which has been described in the literature for its amenability to controlled crystal nucleation and crystal growth—5% $Na_2O$ by weight, 54–60% $SiO_2$, 0–7% $Al_2O_3$, 24–27% CaO, 10% $CaF_2$. Typically, the following composition may be used: 54% $SiO_2$, 5% $Na_2O$, 7% $Al_2O_3$, 24% CaO, 10% $CaF_2$.

In other cases it may be desirable to use $Ca_3(PO_4)_2$ instead of $CaF_2$, and in others it may be desirable to avoid the use of either fluoride or phosphate, or to substitute other alkali metal oxides for sodium oxide.

When the ceramic devices are used for electrical purposes it is necessary that the glass selected should have electrical properties which do not interfere with the electrical behaviour of the device, as for example, in the case of E.M.F. probes for measuring oxygen in liquid metals.

In certain devices it may not be necessary for the glass to penetrate more than a millimeter or so into the cement in order to obtain an effective seal against both the passage of gas and the penetration of liquid metal. In such a case the glass provides a coating to the cement and at the time penetrates a short distance along the pores in the cement in order for the coating to become satisfactorily bonded. Such a coating may work satisfactorily when only 0.5 to 1 mm. thick. The coating is likely to be more resistant to thermal shock if converted by heat treatment into a material which is primarily microcrystalline.

In one particular use of this process for filling pores in cements, the alumina cement joining the zirconia electrolyte tube of an E.M.F. probe for measuring oxygen in liquid copper, to its surrounding alumina tube, is impregnated after firing with crystallized silicates, by melting into the cement an appropriate amount of glass. If this glass is incorporated into the device as a plug or annular ring of powder before firing the cement, its melting temperature should be such that no glass melts during the firing process.

In another particular use of this process for rendering cements relatively impervious, a small amount of powdered glass is melted over the fired alumina cement joining the zirconia of an E.M.F. probe to the surrounding alumina in such a way that the cement is rendered relatively impervious only over the outer surface of the joint and for a depth of a millimetre or so into the cement. Again, the invention is not limited to that particular example.

In another particular use of this process, the powdered glass may be sized uniformly in suitable proportions with the cement before it is used for joining (a ratio of one part by weight of glass to 5 of cement is suitable for some purpose). After drying and firing in the way normally required for cement alone, allowing a firm but porous refractory network to be formed in the cement, the temperature of the device is raised so that the glass melts and spreads into the channels connecting the pores with one another and so seals these channels.

In all these cases crystallization of the glass may be satisfactory if the device is cooled slowly to 500° C. after melting the glass, for durations lasting 1 to 2 hours, but if more stringent control is required of the properties of the sealing or coating, the separate nucleation and crystallization temperature may be carefully controlled for appropriate times.

What we claim is:

1. The method of manufacturing an "E.M.F." probe for measuring oxygen in liquid metals which probe contains zirconia electrolyte tube surrounded by a surrounding tube of alumina which comprises applying an alumina cement to join the zirconia tube and the surrounding tube of alumina; drying and firing said alumina cement thereby obtaining a porous alumina joint between said tube surfaces; applying a slurry of a silicate glass in powder form to the porous alumina joint; said silicate glass having substantially the following composition: 5% $Na_2O$, 54–60% $SiO_2$, 0–7% $Al_2O_3$, 24–27% CaO, and 10% $CaF_2$, being chemically compatible with said alumina and having electrical properties which do not interfere with the electrical behavior of the "E.M.F." probe melting said silicate glass to permit it to spread into said porous alumina joint; solidifying said silicate glass by cooling first to a temperature at which the glass nucleates rapidly and then raising the temperature to a level at which the nuclei grow rapidly in order to obtain crystals of very small size to thereby seal the porous alumina joint; and wherein the relative amount of silicate glass to alumina cement is 1 part of glass to 5 parts of cement.

2. The method of manufacturing a refractory device which comprises applying an alumina cement to join the surfaces of parts of said device; applying a silicate glass; and melting said silicate glass into the alumina cement in order to fill the connecting channels between pores of the alumina cement and block them with said silicate glass.

3. The method of claim 2 wherein said device is an "E.M.F." probe for measuring oxygen in liquid metals which probe contains an electrolyte tube surrounded by a surrounding tube of refractory material, and which comprises applying the alumina cement to join the electrolyte tube and the surrounding tube of refractory material.

4. The method of claim 2 which comprises introducing the alumina cement in between the surfaces to be joined; drying and firing said alumina cement, thereby obtaining a porous alumina joint between the surfaces; applying a slurry of the silicate glass in powder form to the porous alumina joint; melting said silicate glass to permit it to spread into said porous alumina joint; solidifying said silicate glass to thereby seal the porous alumina joint.

5. The method of claim 2 wherein the silicate glass has a melting temperature higher than the firing temperature of said alumina cement.

6. The method of claim 5 which further comprises introducing a slurried mixture of said alumina cement and said silicate glass in powder form between the surfaces to be joined; raising the temperature to dry and fire said alumina cement; then further raising the temperature to melt and to spread the silicate glass into the porous alumina joint; and then lowering the temperature in order to solidify the silicate glass and to seal the porous alumina joint.

7. The method of claim 6 wherein the silicate glass is solidified by cooling first to a temperature at which the glass nucleates rapidly and then raising the temperature to a level at which the nuclei grow rapidly in order to obtain crystals of very small size.

8. The method of claim 2 wherein the silicate glass has substantially the following composition: 54% $SiO_2$, 5% alkali metal oxide, 7% $Al_2O_3$, 24% CaO, and 10% $CaF_2$.

9. The method of claim 2 wherein the silicate glass has substantially the following composition: 54% $SiO_2$, 5% $Na_2O$, 7% $Al_2O_3$, 24% CaO, and 10% $Ca_3(PO_4)_2$.

10. The method of claim 13 wherein the silicate glass is free from chloride.

11. The method of claim 2 wherein the silicate glass is crystallized by slowly cooling down to a temperature of 500° C. for 1 to 2 hours or more.

12. The method of claim 3 wherein the electrolyte tube is a zirconia tube.

13. The method of claim 12 wherein the surrounding tube of refractory material is a tube of alumina.

14. The method of claim 3 wherein said surrounding tube or refractory material is a tube of alumina.

15. The method of claim 2 wherein the silicate glass has substantially the following composition: 5% $Na_2O$, 54–60% $SiO_2$, 0–7% $Al_2O_3$, 24–27% CaO, and 10% $CaF_2$.

16. The method of claim 2 wherein the silicate glass is cooled to a solid material which is primarily microcrystalline.

References Cited
UNITED STATES PATENTS

| | | | |
|---|---|---|---|
| 3,317,298 | 5/1967 | Klomp et al. | 65—43 |
| 3,438,118 | 4/1969 | Milch et al. | 65—59 |
| 3,195,030 | 7/1965 | Herczog et al. | 65—59 |
| 2,866,298 | 12/1958 | Babcock | 65—43 |

ROBERT L. LINDSAY, JR., Primary Examiner

U.S. Cl. X.R.

65—59, 60